United States Patent [19]

Collins et al.

[11] 3,913,141

[45] Oct. 14, 1975

[54] HEAD AZIMUTH POSITIONING METHOD USING NEWTON'S RINGS

[75] Inventors: Gary W. Collins, Long Beach; Daniel M. Klang, Irvine, both of Calif.

[73] Assignee: California Computer Products, Inc., Anaheim, Calif.

[22] Filed: Apr. 24, 1974

[21] Appl. No.: 463,674

[52] U.S. Cl. ................ 360/109; 356/108; 356/110; 360/128

[51] Int. Cl.$^2$.. G11B 21/24; G11B 5/56; G01B 9/02

[58] Field of Search ............ 360/109, 76, 128, 130, 360/137; 356/108, 110; 33/DIG. 4

[56] References Cited

UNITED STATES PATENTS 3,167,143 1/1965 Savage .............................. 356/108

3,781,489 12/1973 Brand ................................ 360/109

OTHER PUBLICATIONS

IBM Tech. Disc. Bull., Vol. 15, No. 12, p. 3691, 5/73, Interferometer Alignment Tool – Bower

*Primary Examiner*—Bernard Konick
*Assistant Examiner*—Jay P. Lucas
*Attorney, Agent, or Firm*—Bruce D. Jimerson

[57] ABSTRACT

The specification discloses a method and apparatus for positioning the gap of a magnetic transducer with respect to a pre-determined plane by noting the interference pattern caused by the transducer's contact with a plexiglass bar.

1 Claim, 2 Drawing Figures

HEAD AZIMUTH POSITIONING METHOD USING NEWTON'S RINGS

BACKGROUND OF THE INVENTION

A frequent problem in Hi-density magnetic recording devices is that of aligning the magnetic transducer with the recording surface. For optimum performance it is important that the transducer be positioned and oriented so that the gap is in tangential contact with the recording media. What is actually desired is a simple and accurate method of determining the orientation of the head to effect this result. Accordingly, a primary object of the present invention is to provide a method and apparatus for orienting the crown of a magnetic transducer so as to position the gap accurately with respect to a pre-determined reference plane.

Other objects and advantages of the present invention will be obvious from the description of a preferred embodiment given herein below.

SUMMARY OF THE INVENTION

The above mentioned objects of the present invention are realized by utilizing a transparent bar which is positioned to have a surface coincident with the plane of the surface to which the transducer is to be aligned. The curve crown of the transducer when placed in contact with the bar will result in a small interference circle. The transducer can then be oriented so that the interference circle coincides with the gap of the recording transducer.

DESCRIPTION OF A PREFERRED EMBODIMENT

Figure 1:
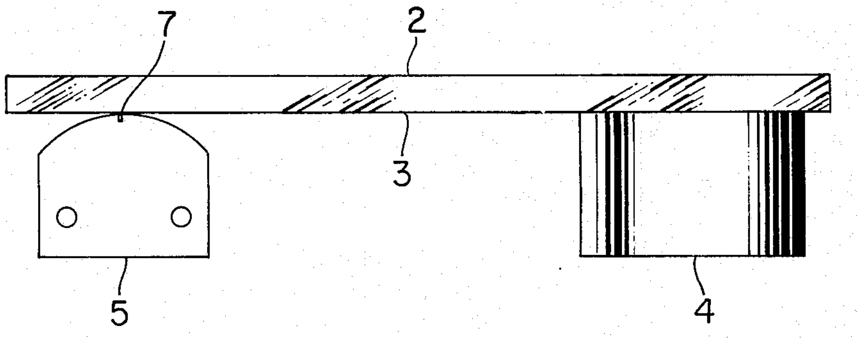
FIG. 1 shows a side elevation of the transducer and the aligning element.
Figure 2:
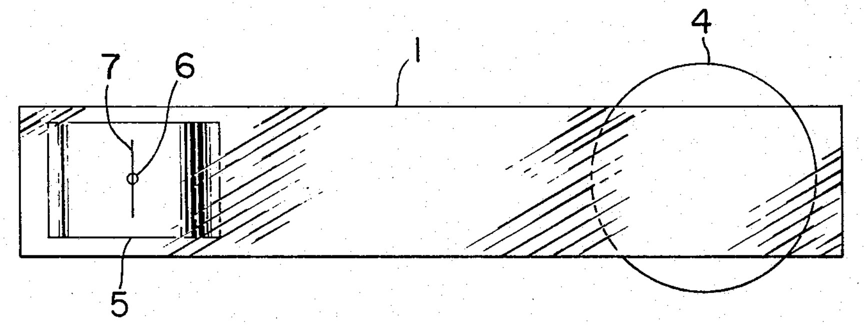
FIG. 2 shows a plan view of the same arrangement.

Adverting to the drawings, a preferred method for practicing the present invention utilizes a plexiglass bar 1 having two flat parallel surfaces 2 and 3. One surface (e.g. surface 3) is placed in tangential contact with a surface 4 having the same plane as the surface of the recording medium with respect to which the head is to be aligned. For example, surface 4 could be the top of a magnetic disk mounting hub. When the head 5 is brought into contact with the plexiglass bar 1, one can observe a tiny dark spot 6 at the point where the curved head contacts the surface of the plexiglass. The dark spot results from the interference pattern classically known as Newton's rings. When the orientation of the head is altered with respect to the under surface 3, so as to change the tangent point, the dark spot will shift. By rotating the head 5 with respect to its mounting, a point will be found where the dark spot 6 is directly centered over the gap 7. When this position is found, the gap will be at its apex — and properly azimuth oriented with respect to the plane of interest. The position of the head can then be fixed to preserve the alignment.

Although the basic method of the invention has been shown and described in connection with rigid magnetic surfaces — it will be evident that its applicability is not limited thereto. The principle may be utilized to orient any curved surface with respect to a predetermined plane. Thus, although a preferred embodiment has been shown and described, it will be evident that the invention is not limited thereto, and that numerous changes, modifications and substitutions may be made without departing from the spirit of the invention.

We claim:

1. A method for aligning the gap between the poles of a magnetic head of the type having a curved surface comprising the steps of:

positioning a flat rigid transparent surface in contact with the curved surface of the magnetic head;

orienting the head azimuth while maintaining contact with the transparent surface;

observing the interference produced at the contact point between the curved head and the transparent surface as the azimuth orientation of the head is changed;

fixing the orientation of the head when the interference is coincident with the gap.

* * * * *